United States Patent
Nielsen

[19]
[11] Patent Number: 5,803,207
[45] Date of Patent: Sep. 8, 1998

[54] BRAKE ASSEMBLY FOR A CYCLE

[76] Inventor: Peter M. Nielsen, 21 Nut Island Ave., Quincy, Mass. 02169

[21] Appl. No.: 557,349
[22] Filed: Nov. 14, 1995
[51] Int. Cl.[6] ................................................ B62L 1/00
[52] U.S. Cl. .......................... 188/24.12; 188/24.21; 280/280; 280/288.3
[58] Field of Search .................. 280/279, 280, 280/288.3; 188/24.11–24.22, 216; 74/104, 107

[56] References Cited

U.S. PATENT DOCUMENTS

| 3,294,205 | 12/1966 | Schanz | 188/216 |
|---|---|---|---|
| 3,305,048 | 2/1967 | Brilando | 188/24.12 |
| 3,776,333 | 12/1973 | Mathauser | 188/24.19 |
| 4,269,290 | 5/1981 | Thiel | 188/216 |
| 4,301,894 | 11/1981 | Avai | 188/216 |
| 5,094,322 | 3/1992 | Casillas | 188/24.22 |

FOREIGN PATENT DOCUMENTS

| A018985 | 8/1914 | France | 188/24.21 |
|---|---|---|---|
| 0571341 | 5/1924 | France | 188/24.21 |
| 0771873 | 10/1934 | France | 188/24.21 |
| 0945003 | 4/1949 | France | 188/24.21 |
| 0690683 | 6/1965 | Italy | 188/24.21 |
| 0309887 | 12/1989 | Japan | 188/24.21 |
| WO9404409 | 3/1994 | WIPO | 188/24.21 |

Primary Examiner—Chris Schwartz
Attorney, Agent, or Firm—Pandiscio & Pandiscio

[57] ABSTRACT

A novel brake assembly is provided for a cycle. The cycle is provided with at least one portion having cavities therein, and the brake assembly includes a brake actuator mounted on the cycle, a pair of brake calipers mounted in the cavities and pivotally attached to the cycle, a caliper-actuating body, and a motion transfer assembly coupled to and movable by the brake actuator. The caliper actuating body is connected to the motion transfer assembly. The calipers are provided with with first and second arm portions, each of the first arm portions having thereon a ramp surface engaged with the body, and each of the second arm portions being configured to receive and retain a brake pad. The calipers are pivoted by the caliper-actuating body, acting on the ramp surfaces in response to movement of the motion transfer assembly, so as to move the calipers in a direction that brings the brake pads into engagement with a wheel of the cycle, so as to exert a braking force on the cycle. A spring urges the calipers to pivot in a direction to move the brake pads away from the wheel.

42 Claims, 7 Drawing Sheets

BRAKE ASSEMBLY FOR A CYCLE

BACKGROUND OF THE INVENTION

1. Field of the Invention

This invention relates to wheel brakes and is directed more particularly to a hand-operated caliper type brake assembly for a cycle.

2. Description of the Prior Art

Hand-operated caliper type brake assemblies for bicycles, and the like, are known in the art. Examples of such assemblies are shown and described in U.S. Pat. No. 4,553,641, issued Nov. 19, 1985 to Edward L. Scott, et al.; U.S. Pat. No. 4,754,853, issued Jul. 5, 1988 to Masashi Nagano; U.S. Pat. No. 4,765,443, issued Aug. 23, 1988 to Charles B. Cunningham; U.S. Pat. No. 4,766,979, issued Aug. 30, 1988 to Masashi Nagano; U.S. Pat. No. 4,969,539, issued Nov. 13, 1990 to Hideyuki Ishibashi; and U.S. Pat. No. 5,012,900, issued May 7, 1991 to Hideyuki Ishibashi.

In such prior art brake assemblies, the entire assembly is fixed to external components of the cycle, reducing the aerodynamic profile of the cycle, decreasing aerodynamics efficiency and, therefore, speed.

Further, in such prior art brake assemblies, the caliper mechanism typically is pivotally mounted on a spindle which projects outwardly from a cycle frame portion. Usually, a caliper arm is disposed on either side of a wheel rim. When the brake is applied, usually by a hand-operated lever mounted on a handlebar, the caliper arms, with brake pads mounted thereon, move inwardly toward the rim of the wheel. The pads grip the rim, frictionally slowing the rotation of the wheel. As the pads grip the rim of the wheel, the pads are drawn in the same direction as the movement of the wheel, flexing the pads, and the caliper arms on which the pads are mounted. Thus, the braking load is in part absorbed by the caliper arms and in part transferred to the cycle frame, by way of the spindle. Such mechanisms typically lead to vibration of the cycle frame, which are perceptible to the rider. Further, fatigue in the caliper arms and spindle can result in failure of those components, usually at an inappropriate time, as in the midst of a braking operation.

Another problem associated with prior art cycle braking assemblies results from the location of the caliper arms and brake pads in exposed positions susceptible to accumulations thereon of road dirt and contaminants. The build-up of dirt and contaminants on the brake components is a continuing problem requiring periodic cleaning of the components and occasional disassembly and reassembly of the entire brake assembly.

Still another problem found by cycle enthusiasts is produced by the fact that in many brake assemblies, the two caliper arms are of different configurations, requiring the manufacture of two different caliper arms, leading to increased costs and further difficulty in maintaining a complete set of replacement components and in effecting repairs.

A still further difficulty arises from the "add-on" nature of prior art brake assemblies. In order to position the assembly on the frame, and have the brake pads within range of a wheel rim, it often is necessary to use brackets, washers, spacers, and the like, to properly position the caliper arms.

A still further problem arises from the fact that typically the actuating lever for prior art brake assemblies is positioned on a handlebar and the assembly includes a cable assembly attached at one end to the lever and at another end to a side linkage associated with the caliper arms. Thus, the brake usually can be actuated by a single cable or assembly of cables, connected to the single lever and the caliper arms. In some bicycles, particularly racing bicycles, there are provided second aerodynamic handlebars, referred to as "time trial bars" which project forwardly from the crossbar of a standard set of racing handlebars. Such time trial bars are positioned so as to straddle the point where the regular handlebars connect to the steering tube. It is common in bicycle racing for a rider to hold on to the time trial bars, such that the rider is positioned low and forward of the point where the steering bar connects to the handlebars. In some prior art braking assemblies, it has been impractical to place a brake lever on the time trial bars which actuates the same brake that is normally actuated by the standard brake hand lever mounted on the handlebars. Thus, the rider must remove a hand from the time trial bars and reach rearwardly to grasp the brake lever, a maneuver known to be awkward and fraught with danger.

A still further shortcoming typical of prior art brake assemblies relates to tolerance "stack-up" problems and their effect upon changing brake pads. The tolerances associated with slots that receive a wheel in a wheel fork, and the tolerances associated with the positioning of the brake assembly on the fork, have been compensated for by the provision of a slotted fixture to hold the brake pads on the caliper arms. Tolerance mismatch or "stack-up" associated with the positions of the wheel axle and the brake assembly are compensated for by adjusting the brake pads within the brake pad slots, relative to the wheel rim. As a result, adjusting or changing brake pads is a tedious and time-consuming task.

Thus, there is a need for a brake assembly wherein the above-noted difficulties in prior art assemblies are eliminated or ameliorated.

SUMMARY OF THE INVENTION

An object of the present invention is to provide a brake assembly for a cycle wherein the brake assembly is largely housed in frame portions, such that the brake assembly detracts minimally from the cycle aerodynamics.

Another object of the present invention is to provide a brake assembly for a cycle wherein a braking load is smoothly transferred to the frame of the cycle, without substantial vibration.

Another object of the invention is to provide a brake assembly substantially protected from dirt and other road contaminants.

A further object of the invention is to provide a brake assembly having few parts and, in particular, identical caliper arms, such that only one arm need be manufactured.

A further object is to provide such a brake assembly requiring no extra-positioning components, such as brackets, washers, spacers, and the like.

A still further object is to provide such a brake assembly amenable to actuation from a plurality of actuating levers disposed in different locations on the cycle.

A still further object of the invention is to provide such a brake assembly wherein "tolerance "stack-up" is essentially eliminated and changing of brake pads is a simple and quick operation.

With the above and other objects in view, as will hereinafter appear, a feature of the present invention is the provision of a brake assembly for a cycle, the assembly comprising a brake actuator mounted on the cycle, a motion transfer assembly fixed to and extending from the brake actuator and movable thereby, and a caliper-actuating body connected to the motion transfer assembly. The brake assembly further comprises a first caliper arm having first and second arm portions pivotally movable by the body acting thereon in response to movement of the motion transfer assembly, to move a first brake pad on the first caliper arm toward a wheel of the cycle. Frame portions of the cycle are provided with cavity means therein. The first caliper arm, the caliper-actuating body, and at least a portion of the motion transfer assembly is disposed in the cavity means. The first arm portion is movable from the cavity means to advance the first brake pad toward the wheel.

In accordance with another feature of the invention, there is provided a brake assembly for a cycle, the assembly comprising a brake actuator mounted on the cycle, a motion transfer assembly fixed to and extending from the brake actuator, and movable thereby, and a caliper-actuating body connected to the motion transfer assembly. The brake assembly further comprises a first caliper arm pivotally mounted on the cycle and having first and second arm portions, the first arm portion having thereon a first ramp surface engaged with said caliper-actuating body, and the second arm portion having first means for receiving and retaining a brake pad, the first caliper arm being pivotally movable by the caliper-actuating body acting on the first ramp surface, in response to movement of the motion transfer assembly, to move the first brake pad receiving means toward a wheel of the cycle.

In accordance with a further feature of the invention, the above-described brake assembly is further provided with a second caliper arm pivotally mounted on the cycle, and having third and fourth arm portions, the third arm portion having thereon a second ramp surface engaged with the caliper-actuating body, and the fourth arm portion having second means for receiving and retaining a second brake pad, the second caliper arm being pivotally movable by the caliper-actuating body acting on the second ramp surface, simultaneously with the caliper-actuating body acting on the first ramp surface, in response to the movement of the motion transfer assembly, to move the second brake pad receiving means toward the wheel of the cycle, the first and second caliper arms being of substantially the same configuration, and opposed to each other, with the second and fourth arm portions being on opposite sides of the wheel.

In accordance with a further feature of the invention, there is provided a spring bearing against the first and second caliper arm second and fourth arm positions, respectively, to bias the first and second brake pad receiving means away from the wheel and away from each other.

In accordance with a still further feature of the invention, there is provided a cycle fork crown and a cycle first fork blade having a first portion of a brake cavity therein, the first caliper arm being mounted in the first portion of the cavity. There is further provided a second portion of the brake cavity, formed in the cycle fork crown and a second fork blade. The second caliper arm is mounted in the second portion of the cavity, the first and second caliper arms being opposed to each other and on opposite sides of the wheel. The body comprises rollers which are disposed in the cavity; and the spring is disposed in the cavity. The cavity comprises sidewalls extending widthwise of the frame, and the first and second caliper arms are pivotally mounted between the sidewalls and are engageable with the sidewalls.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
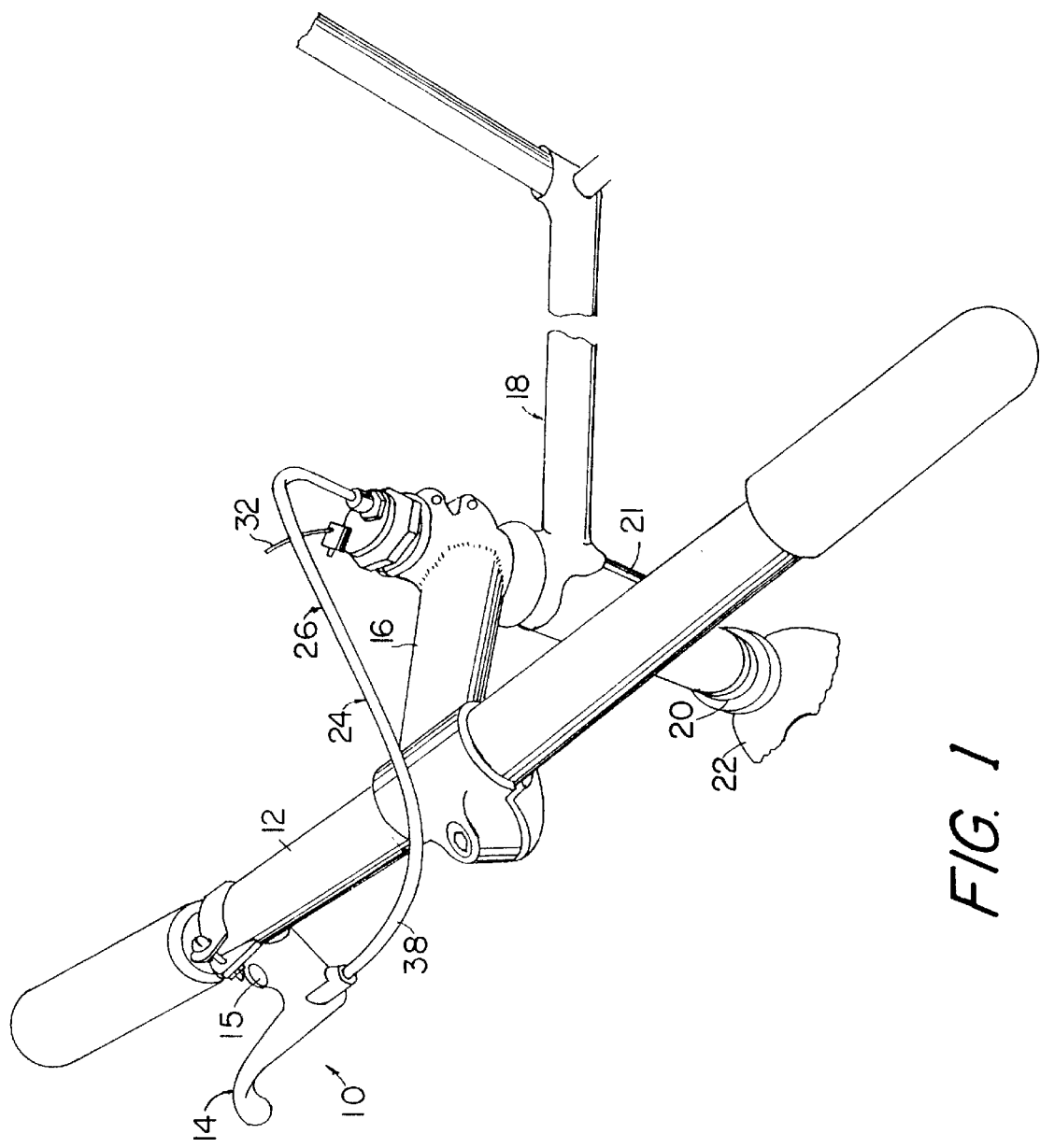
FIG. 1 is a perspective view of portions of a cycle and external portions of one form of brake assembly illustrative of an embodiment of the invention.

Referring to FIG. 1, it will be seen that an illustrative embodiment of the invention includes a brake actuator 10, typically mounted on a handlebar 12 and typically comprising a hand-operated lever 14 that has a pivot 15. The handlebar 12 is fixed to steering post assembly 16 that includes a hollow steering post 20 that is rotatably received in a steering tube portion 21 of a bicycle frame 18. The steering post 20 is, in turn, fixed to a crown portion 22 of a fork assembly 23.

Fixed to lever 14 is motion transfer assembly 24 (FIG. 2), which comprises a cable assembly 26 including a brake cable 28 fixed at one end 30 to lever 14 and anchored to frame 18 at the other end 32, a pulley 34 engaged with brake cable 28, and an actuator cable 36 depending from pulley 34 and movable by linear movement of pulley 34. The brake cable 28 is housed in part in a sheath 38 and in part, along with the remainder of cable assembly 26, in steering post 20.

Figure 2:
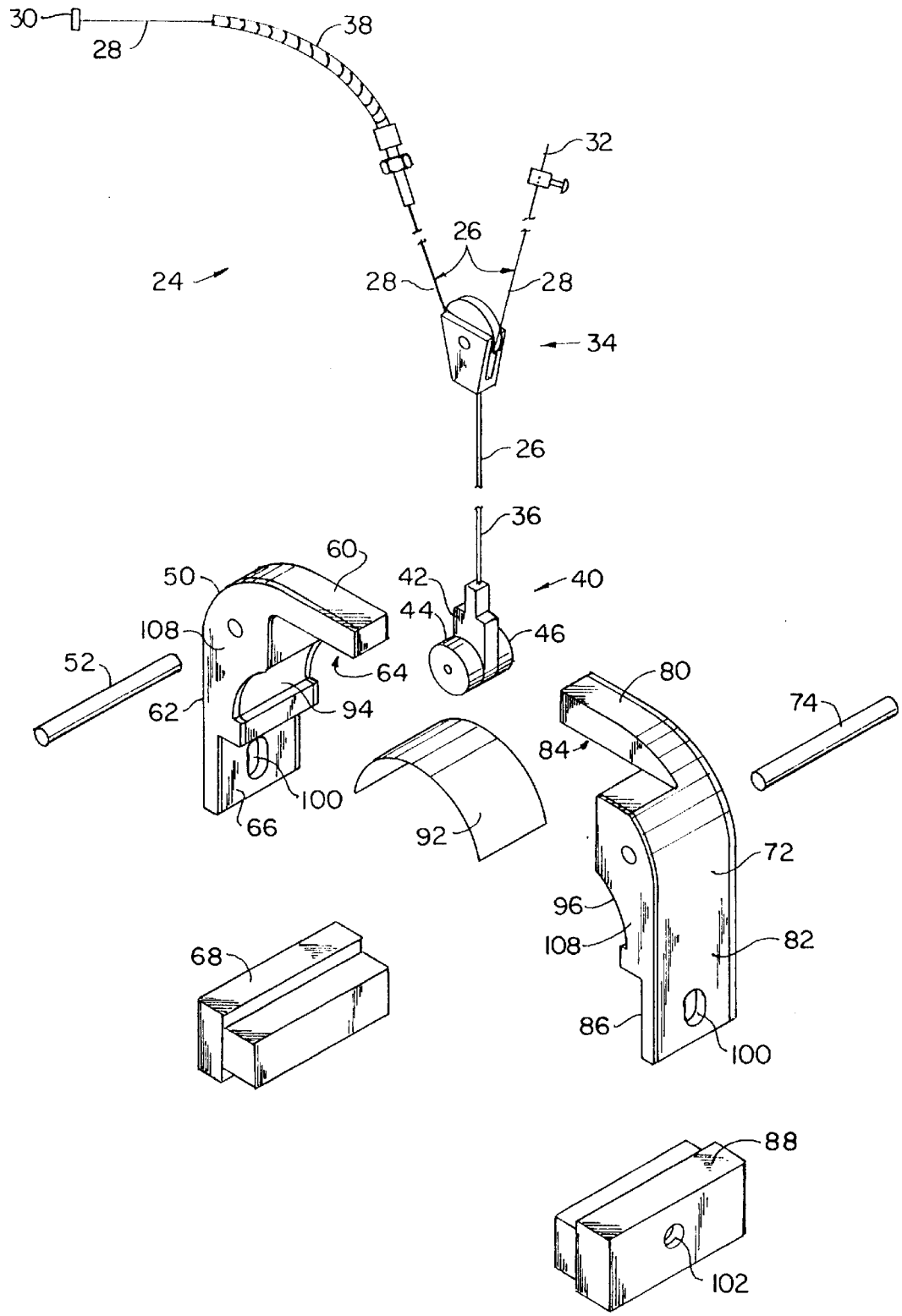
FIG. 2 is a perspective exploded view of portions of the brake assembly.

Fixed to an end of actuator cable 36 remote from pulley 34 is a caliper-actuating body 40 (FIG. 2). The body 40 preferably includes a block portion 42 on which are rotatably mounted first and second rollers 44, 46. As is evident form FIGS. 2,3 and 5, rolllers 44 and 46 have a common axis of rotation.

Figure 3:
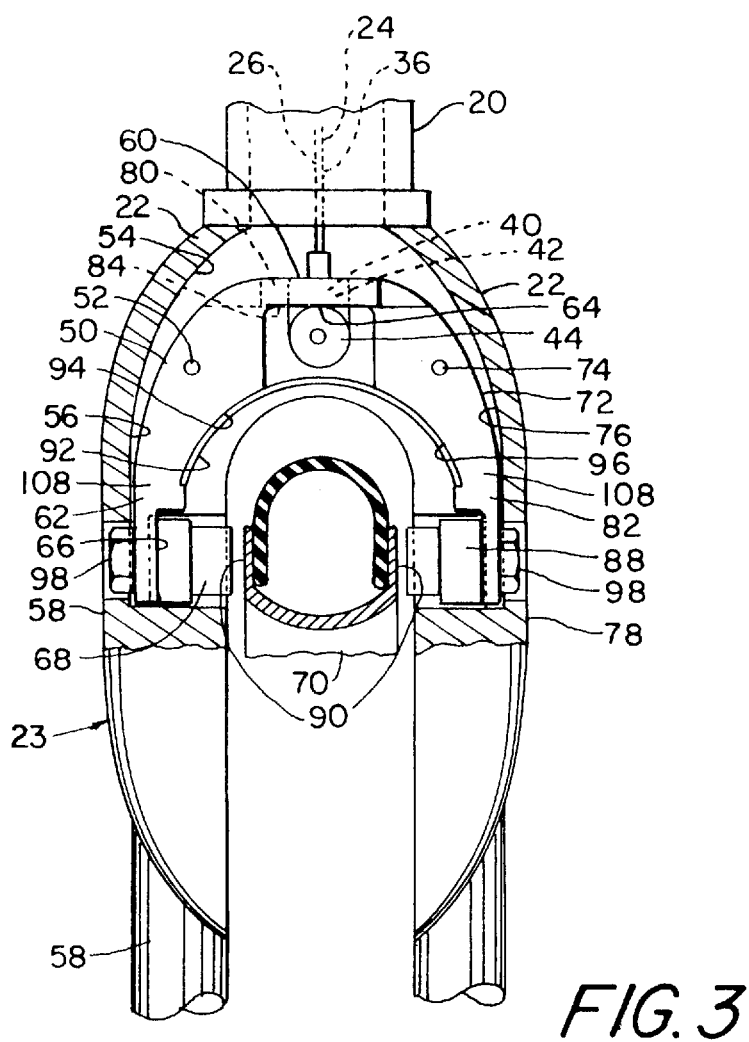
FIG. 3 is in part a sectional and in part an elevational view of portions of the brake assembly.
Figure 4:
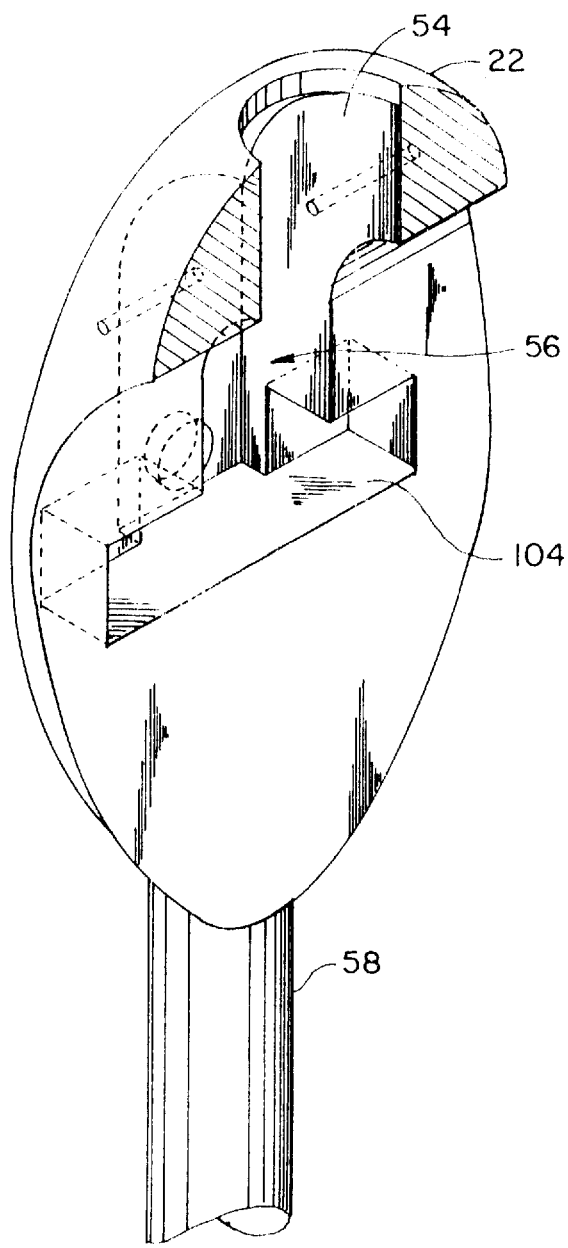
FIG. 4 is a perspective view, partly in section, of a portion of the brake assembly.
Figure 5:
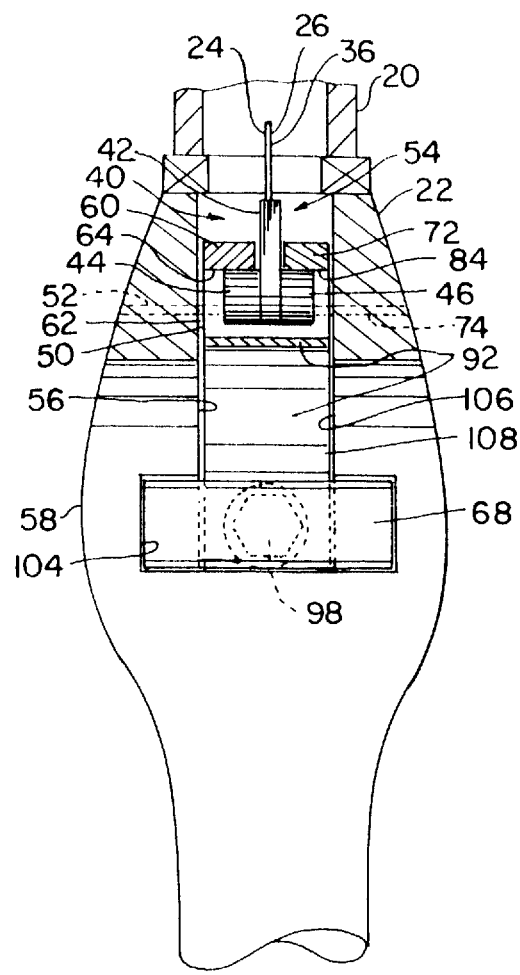
FIG. 5 is a partly sectional, partly elevational view of portions of the brake assembly.

As shown in FIGS. 2, 3 and 5, the brake assembly includes a first caliper arm 50 pivotally mounted on a pivot pin 52 attached to crown portion 22. Arm 50 is disposed in a first portion 56 (FIG. 3) of a cavity 54 (FIG. 4) formed in crown portion 22 and a first fork blade 58 extending from the crown portion 22. The caliper arm 50 has arm portions 60 and 62 extending at an angle to one another. The arm portion 60 has thereon a substantially flat ramp surface 64 engaged with the first roller 44 on body 40.

The arm portion 62 of caliper arm 50 is provided with first means, such as a recess or groove 66, for receiving and retaining a brake pad 68. The caliper arm 50 is pivotally movable on pivot pin 52 by body 40 acting on ramp surface 64, in response to movement of the motion transfer assembly 24, to move the brake pad receiving means 66 toward a wheel 70 (FIG. 3) of the cycle.

Referring still to FIGS. 2, 3 and 5, it will be seen that the brake assembly includes a second caliper arm 72 pivotally mounted on a pivot pin 74 attached to crown portion 22. Arm 72 is disposed in a second portion 76 of cavity 54, formed by the crown fork portion 22 and a second fork blade 78 extending from the crown fork portion 22. The caliper arm 72 has arm portions 80, 82. The arm portion 80 has thereon a ramp surface 84 engaged with rigid body 40, and more particularly, engaged with second roller 46. As is evident from FIGS. 3 and 5 as is obvious from the fact that ramp surfaces 64 and 84 are engaged by coaxial rollers 44 and 46 respectively, arm portion 80 of caliper arm 72 extends alongside of and overlaps arm portion 60 of caliper arm 50.

The arm portion 82 of caliper arm 72 is provided with second means, such as a recess or groove 86, for receiving and retaining a brake pad 88. The caliper arm 72 is pivotally movable by body 40 acting on ramp surface 84, in response to the movement of the motion transfer assembly 24, to move the brake pad receiving means 86 toward wheel 70 (FIG. 3). The caliper arm portions 62, 82 are on opposite sides of the wheel 70, and are positioned so as simultaneously to move brake pads 68, 88 into engagement, respectively, with opposite sides of a rim portion 90 of wheel 70.

The first and second caliper arms 50, 72 are of the same size and configuration and hence are interchangeable.

Still referring to FIGS. 2, 3 and 5, it will be seen that the brake assembly includes a spring means, preferably a leaf spring 92, engaged with opposed surfaces 94, 96 (FIGS. 2 and 3) of arm portions 62, 82, respectively. Spring 92 is generally U-shaped in its installed configuration and acts on surfaces 94, 96 to urge caliper arms 50, 72 to pivot so as to move the brake pads away from wheel 70.

The means 66, 86 for receiving and retaining the brake pads 68, 88 include locking means, such as screws or bolts 98 (FIG. 3), insertable through elongated holes or slots 100 (FIG. 2) and engageable with threaded holes 102 to lock the brake pads 68, 88 in their respective grooves 66, 86. It will be apparent that other fastener means (not shown) may be used instead of screws or bolts.

Referring to FIG. 4, it will be seen that the first portion 56 of cavity 54, includes a recess 104 for housing caliper arm 50, including the brake pad receiving and retaining means 66, and brake pad 68. The opposed second portion 76 of cavity 54 comprises substantially a mirror image of the cavity and recess arrangement shown in FIG. 4. Sidewalls 106 (FIG. 5) are provided in the cavity 54, including the cavity portions 56, 76. Sidewalls 106 extend widthwise of crown portion 22, and are spaced apart a distance only slightly greater than the width of the second arm portions 62, 82 of the two caliper arms. The side surfaces 108 (FIG. 2) of caliper arms 50, 72 lie close to or slidingly engage the cavity sidewalls 106. Preferably side surfaces 108 are coated with a low-friction material, such as, TEFLON®, or the like.

In operation, a rider utilizes the brake assembly by manipulation of lever 14, causing movement of brake cable 28, in turn causing linear movement of pulley 34 upwardly, as viewed in FIG. 2. Upward movement of pulley 34 causes upward movement of body 40, which causes rollers 44 and 46 to ride along the ramp surfaces 64, 84, to cause caliper arms 50 and 72 to pivot so as to cause arm portions 62, 82 to move toward wheel rim portion 90. Brake pads 68, 88, carried by the caliper arm portions 62, 82, engage the wheel rim portion 90, to cause slowing and/or stopping of the wheel.

Upon engagement of wheel rim 90 by brake pads 68, 88, a thrust is imparted to the brake pads, and thereby to the caliper arms 50, 72, causing caliper arm side surfaces 108 to engage sidewalls 106, to transfer the braking load to the frame via the fork assembly.

In the embodiment illustrated in FIGS. 1–5, the body 40 comprises the aforementioned rollers 44, 46 rotatably mounted on a block 42 secured to actuator cable 36. In operation, rollers 44, 46 roll along ramp surfaces 64, 84, respectively, as body 40 is drawn upwardly by operation of hand lever 14. It is readily apparent that while rollers 44, 46 provide a smooth engagement with the ramp surfaces 64, 84, a non-rotating curved or round member, or pair of members, slidable along the ramp surfaces 64, 84 could be used effectively.

Upon release of the brake lever 14 by the rider, spring 92 urges the caliper arms 50, 72 back into their outward-most positions, releasing the wheel rim 90, and returning brake pads 68, 88, and their associated mechanisms, back into cavity 54.

To change brake pads, the rider need only loosen screws 98, replace the brake pads, and secure the brake pads with the screws.

Figure 6:
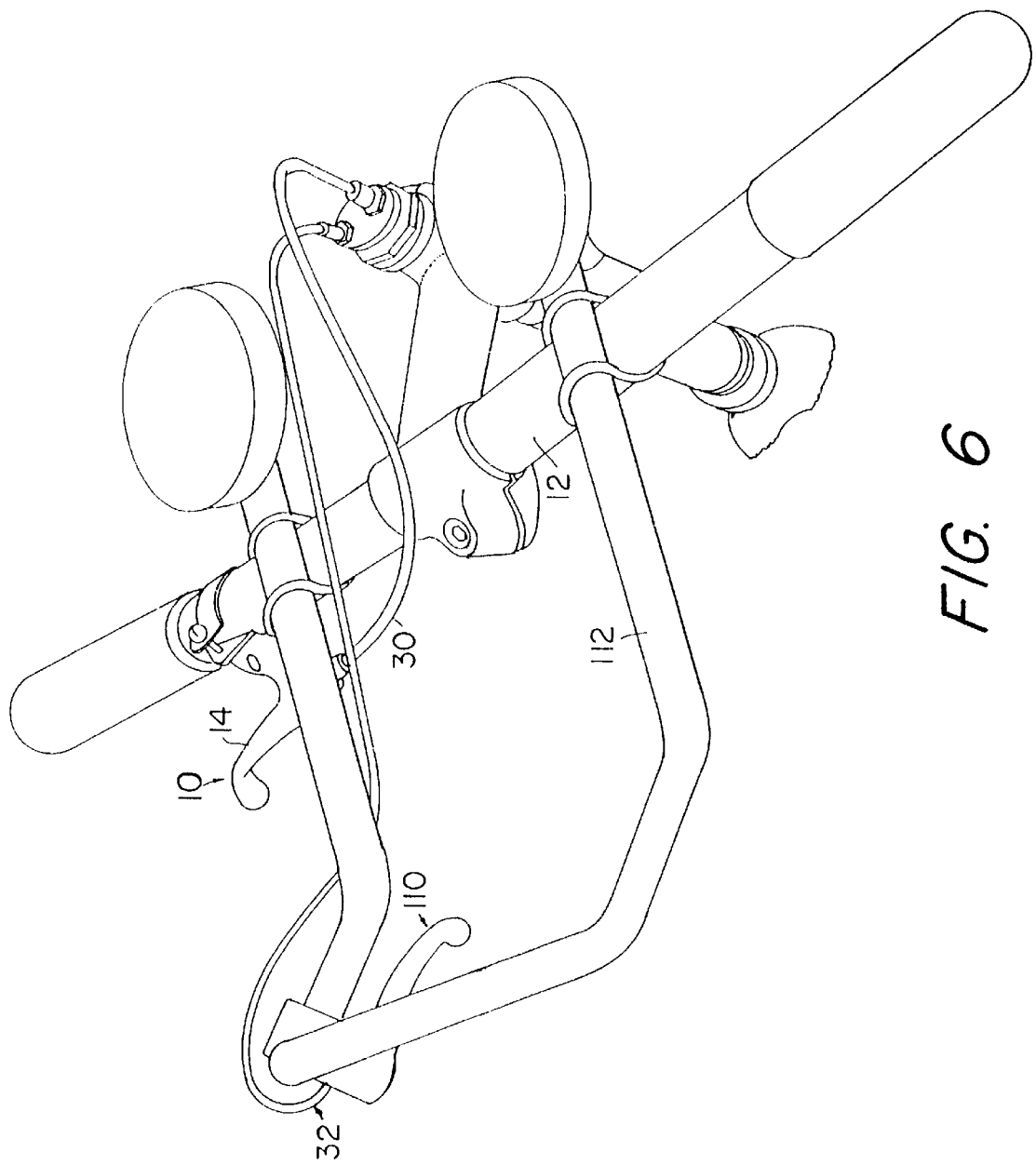
FIG. 6 is similar to FIG. 1, but illustrative of an alternative embodiment of the invention.

Referring to FIG. 6, it will be seen that instead of anchoring brake cable end 32 to the cycle frame, as shown in FIG. 1, brake cable end 32 may be secured to a second lever 110 located apart from the lever 14, as, for example, on "time trial bars" 112 attached to handlebar 12. The use of time trial bars 112 require the rider's hands to be located remote from the brake lever 14. In actuation of either lever 14, 1 10, the other end of brake cable 28 is anchored to the other lever, providing the required movement of pulley 34 upon actuation of either lever.

Figure 7:
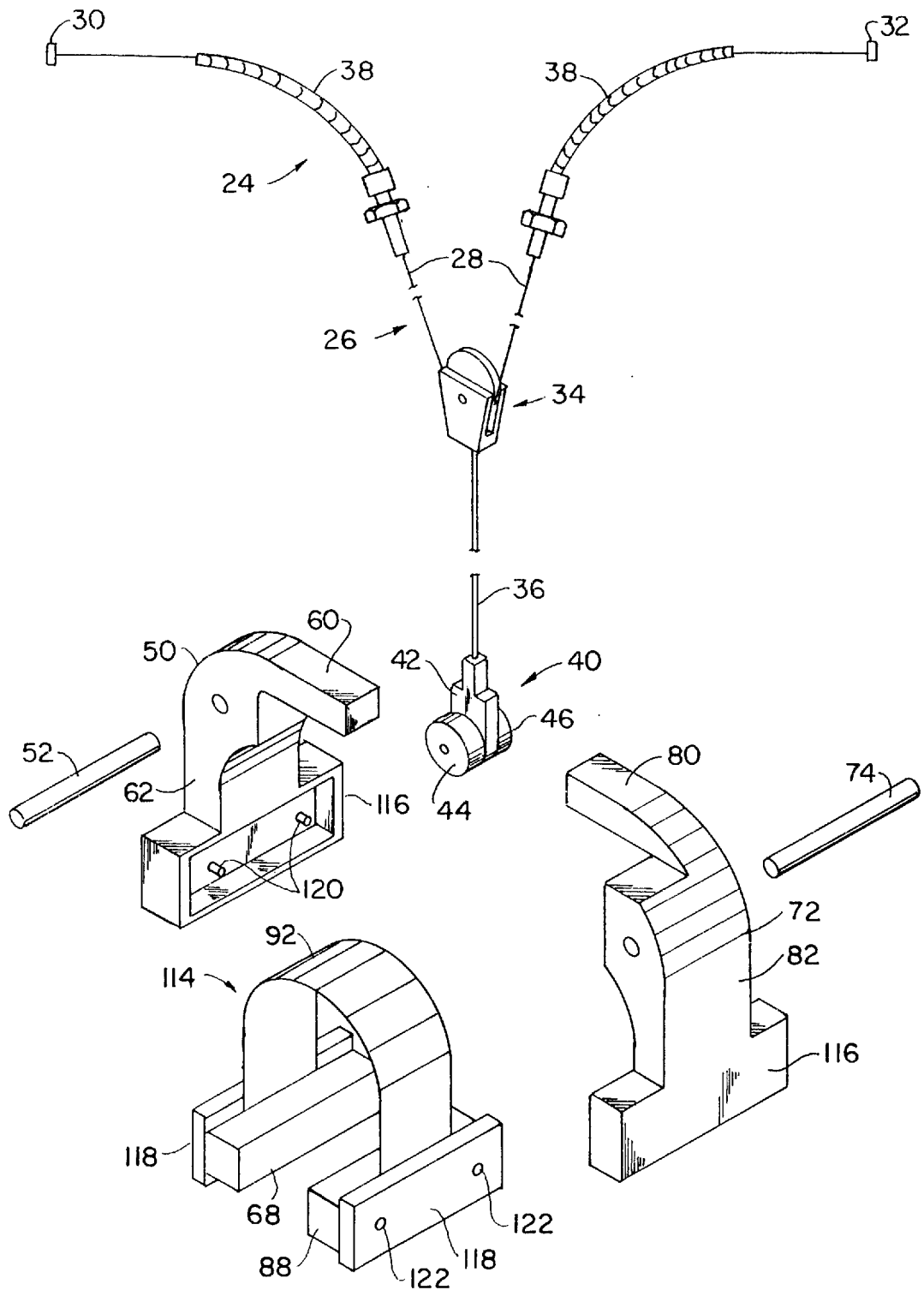
FIG. 7 is similar to FIG. 2 but further illustrative of the alternative embodiment of FIG. 6, and illustrative of another alternative embodiment.

In FIG. 7, there is shown an alternative embodiment in which spring 92 and brake pads 68, 88 are combined in a single replaceable unit 114. To accommodate the unit 114, the caliper arms 50, 72 are each provided with brake pad receiving and retaining means, each comprising a box 116 formed in each caliper arm and adapted to receive a rear or back portion 118 of a brake pad and having therein detents or locating pins 120 adapted to engage holes 122 in the backing portions 118. The pins 120, in combination with spring 92, operate to lock brake pads 68, 88 against fore and aft movement relative to their respective caliper arms 50, 72. Of course, the caliper arms 50, 72 are disposed in cavities as described above.

In the alternative embodiment shown in FIG. 7, the procedure for changing brake pads is simple. The rider need only grasp the brake pads and squeeze them toward each other far enough to remove the unit 1 14, and then insert a new brake unit 1 14, permitting the pad backing portions 1 18 to snap onto the pins 120. Such pronounced ease of changing brake pads renders much more practicable the use of specialized brake pads for specific conditions.

Thus, there is provided a brake assembly which, due to the fact that assorted components thereof are disposed inside of cycle frame members, offers little interference aerodynamically by virtue of its substantial enclosure in frame portions which may be aerodynamically styled.

There is further provided a brake assembly having improved facility for transferring brake loads to the frame of the cycle, by engagement of the side surfaces 108 of caliper arms with sidewalls 106 of the frame, which is carried out substantially vibration free.

There is also provided a brake assembly substantially protected from road dirt and other contaminants by housing most of the components most of the time in relatively protected frame internal areas.

There is further provided a brake assembly requiring few or no location parts, such as brackets, washers, spacers, and the like, and having relatively few operating components, and which may have two interchangeable caliper arms, such that manufacturing costs are reduced and only one caliper arm part needs to be stocked as replacement protection in case of breakage.

There is still further provided a brake assembly which may be actuated from more than one actuating location, as, for example, from "time trial bars".

There is still further provided a brake assembly wherein "stack-up" of tolerance is essentially eliminated.

Finally, there is provided a brake assembly wherein brake pads may be changed quickly and easily.

It is to be understood that the present invention is by no means limited to the particular construction herein disclosed and/or shown in the drawings, but also comprises any modifications or equivalents within the scope of the claims. Thus, for example, although the invention is shown in combinatioin with a front wheel steering assembly, it also may be used to provide a braking assembly for the rear wheel of a cycle, e.g. the rear wheel of a bicycle.

As used herein, the term "cycle" is intended to include, but not be limited to, bicycles, motorcycles, motor scooters, tricycles, (including wheelchairs) and the like.

What is claimed is:

1. In combination with a cycle, a brake assembly comprising:
    a brake actuator mounted on said cycle;
    a motion transfer assembly fixed to and extending from said brake actuator and movable thereby;
    a caliper-actuating body connected to said motion transfer assembly;
    a first caliper arm having first and second arm portions, pivotally movable by said body acting thereon in response to movement of said motion transfer assembly, for moving a first brake pad on said first caliper arm toward a wheel of said cycle; and
    frame portions of said cycle having cavity means therein, at least a portion of said first caliper arm being disposed in said cavity means and being movable to advance said first brake pad toward said wheel.

2. The combination according to claim 1 further comprising:
    a second caliper arm having third and fourth arm portions pivotally movable by said body acting thereon in response to movement of said motion transfer assembly, for moving a second brake pad on said second caliper arm toward said wheel of said cycle;
    at least a portion of said second caliper arm being disposed in said cavity means and said third arm portion being movable therefrom to advance said second brake pad toward said wheel.

3. The combination according to claim 2 wherein said brake actuator comprises a lever.

4. The combination according to claim 3 wherein said lever is mounted on a handlebar portion of said cycle.

5. The combination according to claim 2 wherein said motion transfer assembly comprises a cable assembly.

6. The combination according to claim 5 wherein said cable assembly comprises:
    a brake cable fixed to said brake actuator and movable thereby;
    a pulley engaged with said brake cable and movable thereby; and
    an actuator cable depending from said pulley and movable by linear movement of said pulley.

7. The combination according to claim 6 wherein said body is connected to an end of said actuator cable.

8. The combination according to claim 1 wherein said body includes a first portion of a rounded configuration.

9. The combination according to claim 8 wherein said body comprises a cylindrically-shaped roller.

10. The combination according to claim 2 wherein said cavity means comprises side walls spaced longitudinally from one another relative to said frame, and said first and second caliper arms are pivotally mounted between said side walls and are restrained against movement by said side walls.

11. The combination according to claim 2 wherein said first and second caliper arms are substantially identical and interchangeable.

12. In combination with a cycle, a brake assembly comprising:
    a brake actuator mounted on said cycle;
    a motion transfer assembly coupled to and extending from said brake actuator and movable thereby;
    a body connected to said motion transfer assembly;
    a first caliper arm having first and second arm portions, said first arm portion having thereon a first ramp surface engaged with said body, and said second arm portion having first means for receiving and retaining a first brake pad;
    a first pivot pin pivotally mounting said first caliper arm to said cycle;
    said first caliper arm being pivotable by said body acting on said first ramp surface in response to movement of said motion transfer assembly so as to move said first brake pad receiving means toward a wheel of said cycle; and
    a second caliper arm having third and fourth arm portions, said third arm portion having thereon a second ramp surface engaged with said body, and said fourth arm portion having second means for receiving and retaining a second brake pad;
    a second pivot pin pivotally mounting said second caliper arm to said cycle;
    said second caliper arm being pivotable by said body acting on said second ramp surface, simultaneously with said body acting on said first ramp surface, in response to said movement of said motion transfer assembly, so as to move said second brake pad receiving means toward said wheel of said cycle, said first and second caliper arms being of substantially the same configuration and opposed to each other, with said first and third arm portions overlapping one another; and
    a leaf spring mounted between said first and second caliper arms, said spring having first and second opposite ends and being curved between its said first and second opposite ends, said leaf spring being disposed so that its said first and second opposite ends bear against said second and fourth arm portions adjacent said first and second brake pad receiving and retaining means so as to bias said first and second caliper arms in a direction to move said brake pad receiving and retaining means away from each other and said wheel.

13. The combination according to claim 12 wherein said motion transfer assembly comprises a cable assembly.

14. The combination according to claim 13 wherein said cable assembly comprises:
   a brake cable fixed to said brake actuator and movable thereby;
   a pulley engaged with said brake cable and movable thereby; and
   an actuator cable depending from said pulley and supporting said body, said actuator cable being movable by linear movement of said pulley.

15. The combination according to claim 12 wherein said brake actuator comprises a lever.

16. The combination according to claim 12 wherein said first and second means for receiving and retaining said first and second brake pads comprises a first groove in said second arm portion for receiving said first brake pad and first fastener means for releasably locking said first brake pad in said first groove, and a second groove in said fourth arm portion for receiving said second brake pad and second fastener means for releasably locking said second brake pad in said second groove.

17. The combination according to claim 12 further comprising first and second brake pads fixed to said second and fourth arm portions respectively.

18. The apparatus in accordance with claim 12 wherein:
   at least a portion of said motion transfer assembly is carried by a frame of said cycle;
   said first and second caliper arms are disposed in a cavity in a portion of said frame and are engageable with front and rear walls of said cavity; and
   said second and fourth caliper arm portions are adapted to move relative to said cavity whereby to move first and second brake pads into engagement with opposite sides of said wheel.

19. In combination with a cycle, a brake assembly comprising:
   a brake lever pivotally mounted on said cycle;
   a pulley assembly comprising a pulley;
   a brake cable fixed to said brake lever and movable thereby, said brake cable passing around said pulley, said pulley assembly being movable linearly by said brake cable when said brake cable is moved by operation of said brake lever;
   a first roller rotatably connected to a free end of said actuator cable and linearly moveable thereby;
   a first caliper arm pivotally mounted on said cycle and having first and second arm portions, said first arm portion having thereon a first ramp surface engaged with and pivotally movable by said first roller, and said second arm portion having first means for receiving and retaining a first brake pad, said first brake pad receiving means being movable by said second arm portion toward and away from a wheel of said cycle; and
   a leaf spring urging said first caliper arm to pivot in a direction to move said second arm portion outwardly from the wheel, and maintain said first arm portion first ramp surface in engagement with said first roller.

20. The combination according to claim 19, said brake assembly comprising a second brake lever pivotally mounted on said cycle, said brake cable being fixed also to said second brake lever so as to be moveable either by said second brake lever or by said first-mentioned brake lever.

21. The apparatus in accordance with claim 19 further comprising:
   a second roller rotatably connected to said free end of said actuator cable and linearly movable thereby, said second roller being coaxial with said first roller;
   a second caliper arm pivotally mounted on said cycle and having third and fourth arm portions, said third arm portion having thereon a second ramp surface engaged with and pivotally movable by said second roller, and said fourth arm portion being pivotally movable with said third arm portion and having second means for receiving and retaining a second brake pad, said second brake pad receiving means being movable by said fourth arm portion toward and away from said wheel of said cycle; and
   said spring urging said second caliper arm to pivot in a direction to move said fourth arm portion outwardly from said wheel and from said second arm portion, and maintain said third arm portion second ramp surface in engagement with said second roller.

22. A bicycle comprising:
   a wheel-supporting structure comprising a crown section and first and second mutually spaced fork sections attached to said crown section;
   a cavity formed at least in part in said crown section, said cavity having a first section in line with said first fork section and a second section in line with said second fork section;
   first and second calipers disposed in said first and second cavity sections;
   means pivotally mounting said calipers to said crown section;
   first and second brake pads attached to said first and second calipers respectively in position to engage a wheel that is disposed between and rotatably supported by said fork sections;
   spring means carried by said crown section for urging said calipers to pivot in a first direction so as to move said brake pads away from said wheel; and
   operating means including an actuating cable connected to said calipers for pivoting said calipers in a second direction so as to move said brake pads toward and into engagement with said wheel.

23. A cycle comprising:
   a frame;
   a wheel-steering assembly attached to said frame, said wheel-steering assembly comprising a crown section and a dual fork section, said dual fork section comprising first and second fork members attached to said crown section;
   a wheel rotatably attached to said fork members;
   a brake assembly disposed in a cavity within said crown section and having first and second brake pads disposed to engage said wheel when said brake assembly is actuated; and
   means for actuating said brake assembly.

24. In combination with a cycle, a brake assembly comprising:
   a brake actuator mounted on said cycle;
   a motion transfer assembly fixed to and extending from said brake actuator and movable thereby;
   a body connected to said motion transfer assembly, said body having first and second rollers rotatable attached thereto;

a first caliper arm pivotally mounted on said cycle and having first and second arm portions, said first arm portion having thereon a first ramp surface engaged with said first roller, and said second arm portion having first means for receiving and retaining a first brake pad, said first caliper arm being pivotally movable by said first roller acting on said first ramp surface in response to movement of said body by said motion transfer assembly to move said first brake pad receiving means toward a wheel of said cycle;

a second caliper arm pivotally mounted on said cycle and having third and fourth arm portions, said third arm portion having thereon a second ramp surface engaged with said second roller, and said fourth arm portion having second means for receiving and retaining a second brake pad, said second caliper arm being pivotally movable by said second roller acting on said second ramp surface, simultaneously with said first roller acting on said first ramp surface, in response to said movement of said body by said motion transfer assembly, to move said second brake pad receiving means toward said wheel of said cycle, said first and second caliper arms being of substantially the same configuration, and opposed to each other, with said second and fourth arm portions being on opposite sides of said wheel;

said motion transfer assembly comprising a cable assembly that includes a brake cable fixed to said brake actuator means and movable thereby, a pulley engaged with said brake cable and movable thereby; by linear movement of said pulley.

25. The combination according to claim 24, further including first and second brake pads attached to said second and fourth arm portions, and a leaf spring disposed entirely between and engaged with said first and second caliper arms for urging said first and second caliper arms in a direction to move said first and second brake pads away from each other.

26. In combination with a cycle having a wheel-supporting structure, brake means comprising first and second brake caliper members disposed in first and second mutually-opposed cavities in said wheel-supporting structure, each of said caliper members comprising first and second arm portions extending at an angle to one another, said first arm portions of said first and second caliper members overlapping each other, first and second brake pads engaged with said second arm portions of said first and second caliper members respectively, means pivotally connecting said first and second caliper members to said wheel-supporting structure so that said caliper members can pivot in a first direction that causes said brake pads to move toward one another and a second opposite direction that causes said brake pads to move away from one another, and spring means biasing said first and second caliper members for pivotal movement in said second direction.

27. The combination according to claim 26 further including caliper member actuating means for engaging both of said first arm portions of said first and second caliper members, and motion-transfer means for moving said caliper member actuating means so as to cause pivotal movement of said caliper members in said first direction.

28. The combination according to claim 27 wherein said caliper members are L-shaped.

29. The combination according to claim 27 wherein said caliper member-actuating means has first and second axially aligned rollers disposed in position to engage the first arm portions of said first and second caliper members respectively.

30. The combination according to claim 27 wherein said motion-transfer means comprises a pulley assembly comprising a rotatable pulley, and further wherein said motion-transfer means comprises a cable having a first end and a second end, said cable extending around and engaged with said rotatable pulley.

31. The combination according to claim 26 wherein said spring means is an arched spring that has its opposite ends engaged with said second arm portions.

32. The combination according to claim 31 wherein said first and second caliper members have recesses for said arched spring.

33. The combination according to claim 26 wherein said second arm portions have recesses for receiving said brake pads.

34. A brake unit for a cycle comprising a U-shaped leaf spring having first and second opposite ends, a first brake pad fixed directly to and carried by said first end of said spring and a second brake pad fixed directly to and carried by said second end of said spring.

35. In combination with a cycle, a brake assembly comprising:

a brake lever pivotally mounted on said cycle;

a pulley assembly comprising a pulley;

a brake cable fixed to said brake lever and movable thereby said cable passing around said pulley, said pulley assembly being movable linearly by said brake cable when said brake cable is moved by operation of said brake lever;

an actuator cable attached to and depending from said pulley and moveable by linear movement of said pulley assembly;

a first roller rotatably connected to a free end of said actuator cable and linearly moveable thereby;

a first caliper arm pivotally mounted on said cycle and having first and second arm portions, said first arm portion having thereon a first ramp surface engaged with and pivotally movable by said first roller, and said second arm portion having first means for receiving and retaining a first brake pad, said first brake pad receiving means being movable by said second arm portion toward and away from a wheel of said cycle;

a second roller rotatably connected to said free end of said actuator cable and linearly movable thereby, said second roller being coaxial with said first roller;

a second caliper arm pivotally mounted on said cycle and having third and fourth arm portions, said third arm portion having thereon a second ramp surface engaged with and pivotally movable by said second roller, and said fourth arm portion being pivotally movable with said third arm portion and having second means for receiving and retaining a second brake pad, said second brake pad receiving means being movable by said fourth arm portion toward and away from said wheel of said cycle; and a spring urging said first and second caliper arms to pivot in a direction to move said second and fourth arm portions outwardly from said wheel and maintain said first and second ramp surfaces of said first and third arm portions in engagement with said first and second rollers respectively.

36. The combination according to claim 35 wherein said actuator cable is disposed within a frame portion of said cycle.

37. The combination according to claim 36 wherein said cycle comprises a fork crown and a first fork blade having a first portion of a cavity therein, said first caliper arm being mounted in said first portion of said cavity, said assembly further comprising a second portion of said cavity formed in said cycle fork crown and a second fork blade, said second caliper arm being mounted in said second portion of said cavity, said first and second caliper arms being opposed to each other and on opposite sides of said wheel, and said rollers being disposed in said cavity and said spring being disposed in said cavity.

38. In combination with a cycle, a brake assembly comprising:

a brake actuator mounted on said cycle;

a motion transfer assembly coupled to and extending from said brake actuator and movable thereby, at least a portion of said motion transfer assembly being carried by a frame of said cycle;

a body connected to said motion transfer assembly;

a first caliper arm having first and second arm portions, said first arm portion having thereon a first ramp surface engaged with said body, and said second arm portion having first means for receiving and retaining a first brake pad, said first caliper arm being disposed in a cavity in a portion of said frame and engageable with front and rear walls of said cavity, said first caliper arm being pivotally mounted to said cycle frame so that said first caliper arm can pivot in said cavity, said first caliper arm being pivotable by said body acting on said first ramp surface in response to movement of said motion transfer assembly to move said first brake pad receiving means toward a wheel of said cycle;

a second caliper arm having third and fourth arm portions, said third arm portion having thereon a second ramp surface engaged with said body, and said fourth arm portion having second means for receiving and retaining a second brake pad, said second caliper arm being disposed in said cavity and engageable with said front and rears walls of said cavity, said second caliper arm being pivotally mounted to said cycle frame so that said second caliper arm can pivot in said cavity, said second caliper arm being pivotable by said body acting on said second ramp surface, simultaneously with said body acting on said first ramp surface, in response to said movement of said motion transfer assembly, to move said second brake pad receiving means toward said wheel of said cycle, whereby brake pads carried by said first and second means for receiving and retaining a brake pad are moved into engagement with opposite sides of said wheel;

said first and second caliper arms being of substantially the same configuration and opposed to each other, with said first and third arm portions overlapping one another.

39. The combination according to claim 38 wherein said first and second means for receiving and retaining said first and second brake pads each comprises a recess adapted to receive one of said brake pads; and further wherein said brake assembly comprises a separable brake unit that comprises a leaf spring having said first brake pad fixed to a first end thereof and said second brake pad fixed to a second end thereof;

said brake unit being insertable between said first and second caliper arms such that said spring biases said brake pads to snap into their respective recesses; and said brake unit being removable from said caliper arms by squeezing said brake pads toward each other against the bias of said spring until said brake pads are clear of their respective recesses.

40. The combination according to claim 39 wherein said recesses are provided with detents adapted to enter holes in backing portions of said brake pads as said brake pads enter their respective recesses.

41. The combination according to claim 38 further including first and second brake pads engaged with said first and second means for receiving and retaining said first and second brake pads, and further wherein said brake assembly comprises a leaf spring disposed between and engaged with said first and second caliper arms, said spring being arranged so as to bias said caliper arms in a direction to move said first and second brake pads away from one another.

42. A brake subassembly for a cycle, said subassembly comprising first and second caliper arms adapted to be pivotally attached to a wheel supporting cycle structure, said caliper arms having recesses for receiving brake pads, and a brake unit comprising a leaf spring having a first brake pad fixed to a first end thereof and a second brake pad fixed to a second end thereof, said brake unit being insertable between said first and second caliper arms such that said spring biases said brake pads said brake unit being removable from said caliper arms by squeezing said brake pads toward each other against the bias of said spring until said brake pads are clear of their respective recesses.

* * * * *

UNITED STATES PATENT AND TRADEMARK OFFICE
CERTIFICATE OF CORRECTION

PATENT NO. : 5,803,207
DATED : September 8, 1998
INVENTOR(S) : Peter M. Nielsen

It is certified that error appears in the above-identified patent and that said Letters Patent is hereby corrected as shown below:

Claim 10, column 8, line 17, after the word "frame", insert the word -- portions --;

Claim 19, column 9, line 46, after the word "lever;" insert the following paragraph: -- an actuator cable attached to and depending from said pulley and movable by linear movement of said pulley assembly;--;

Claim 24, column 10, second last line, the word "rotatable" should be -- rotatably --;

Claim 24, column 11, line 30, after the word "thereby;" insert the phrase -- and an actuator cable depending from said pulley and supporting said body, said actuator cable and thereby said body being movable --; and Claim 42, column 14, line 42, after the word "pads", insert the phrase -- to snap into their respective recesses, --.

Signed and Sealed this

Fifteenth Day of December, 1998

Attest:

BRUCE LEHMAN

*Attesting Officer*  *Commissioner of Patents and Trademarks*